(12) United States Patent
Ye et al.

(10) Patent No.: US 12,724,221 B2
(45) Date of Patent: Sep. 1, 2026

(54) CAMERA MODULE AND ELECTRONIC DEVICE

(71) Applicant: NINGBO SUNNY OPOTECH CO., LTD, Zhejiang (CN)

(72) Inventors: Linmin Ye, Yuyao City (CN); Jinxiu Huang, Yuyao City (CN); Yongming Chen, Yuyao City (CN); Xingyan Fang, Yuyao City (CN); Peng Lu, Yuyao City (CN); Yuxiang Wang, Yuyao City (CN); Jie Yu, Yuyao City (CN)

(73) Assignee: NINGBO SUNNY OPOTECH CO., LTD, Yuyao City (CN)

( * ) Notice: Subject to any disclaimer, the term of this patent is extended or adjusted under 35 U.S.C. 154(b) by 0 days.

(21) Appl. No.: 19/203,188

(22) Filed: May 9, 2025

(65) Prior Publication Data

US 2026/0104569 A1 Apr. 16, 2026

(30) Foreign Application Priority Data

Oct. 16, 2024 (CN) ........................ 202411442004.5

(51) Int. Cl.

| | |
|---|---|
| ***G02B 7/02*** | (2021.01) |
| ***G02B 7/00*** | (2021.01) |
| *H04N 23/55* | (2023.01) |

(52) U.S. Cl.
CPC .............. *G02B 7/02* (2013.01); *G02B 7/006* (2013.01); *H04N 23/55* (2023.01)

(58) Field of Classification Search
USPC .......................................................... 359/819
See application file for complete search history.

(56) References Cited

U.S. PATENT DOCUMENTS

| | | | | |
|---|---|---|---|---|
| 2022/0285064 | A1* | 9/2022 | Lee | G02B 27/646 |
| 2024/0061317 | A1* | 2/2024 | You | G03B 3/10 |

FOREIGN PATENT DOCUMENTS

| | | | |
|---|---|---|---|
| CN | 111770249 | 10/2020 | |
| WO | WO-2022166677 A1 * | 8/2011 | H04N 23/687 |

* cited by examiner

*Primary Examiner* — Stephone B Allen
*Assistant Examiner* — Tamara Y. Washington
(74) *Attorney, Agent, or Firm* — Che-Yang Chen

(57) ABSTRACT

A camera module includes a photosensitive assembly and a lens assembly, the photosensitive assembly includes a support substrate, a photosensitive chip, and a filter element, wherein the filter element is at least partially located above the support substrate, the lens assembly includes a movable part, an optical lens, and a stopper for limiting a movement of the movable part, wherein the optical lens is arranged on the movable part, and the optical lens is located in the photosensitive path of the photosensitive chip, wherein the stopper is located on an outer side of the filter element, and a lower surface of the stopper is lower than an upper surface of the filter element.

10 Claims, 11 Drawing Sheets

CAMERA MODULE AND ELECTRONIC DEVICE

CROSS REFERENCE OF RELATED APPLICATION

This application is a non-provisional application that claims priority under 35U.S.C. § 119 to China application number CN202411442004.5, filing date Oct. 16, 2024, wherein the entire content of which is expressly incorporated herein by reference.

BACKGROUND OF THE PRESENT INVENTION

Field of Invention

The present invention relates to field of imaging technology, and more particular to a camera module and electronic device.

Description of Related Arts

With the advancement and development of technology, electronic devices with camera functionality are increasingly trending toward high performance and a thinner, lighter design. As one of the core components of electronic products, camera modules must inevitably undergo adaptive adjustments in terms of performance and size. In other words, during this wave of technological innovation, various components within the camera module must undergo corresponding changes in performance and size.

As electronic devices such as mobile phones demand increasingly thinner and more compact camera modules, the level of functional integration within camera modules has also increased. In conventional technology, a camera module typically includes a lens assembly and an image sensor assembly that are assembled together. The lens assembly includes a motor, which may comprise a fixed part and a movable part that is constrained to the fixed part in a manner that allows movement and/or rotation. The movable part is equipped with a lens, which is positioned along the photosensitive path of the image sensor assembly. This design enables the movable part to drive the lens to move and/or rotate with respect to the image sensor assembly, thereby achieving the focusing and/or optical image stabilization functions of the camera module.

To limit the movement and/or rotation of the movable part, conventional motors typically include a stopper made of cushioning material, which is set on either the fixed part or the movable part. This stopper helps to reduce debris generation and deformation when it comes into contact with a colliding object.

However, in conventional camera modules, the lens assembly is usually positioned entirely above the image sensor assembly, resulting in a relatively large overall height of the camera module. This makes it difficult to meet the requirements for thinner and more compact camera modules.

SUMMARY OF THE PRESENT INVENTION

The invention is advantageous in that it provides a camera module and electronic device which can effectively reduce the height of the camera module and meet the requirements of making the camera module thin and light.

In order to achieve at least one of the above advantages or other advantages and purposes of the present invention, the present invention provides a camera module, comprising:

a photosensitive assembly comprising a support substrate, a photosensitive chip disposed on the support substrate, and a filter element disposed in a photosensitive path of the photosensitive chip, wherein the filter element is at least partially located above the support substrate; and a lens assembly, wherein the lens assembly is assembled on the support substrate, and the lens assembly comprises a movable part, an optical lens, and a stopper for limiting a movement of the movable part; wherein the optical lens is arranged on the movable part, and the optical lens is located in photosensitive path of the photosensitive chip, wherein the stopper is located on an outer side of the filter element, and a lower surface of the stopper is lower than an upper surface of the filter element.

With such a configuration, the camera module of the present application moves the stopper outward to the outer side of the filter element, allowing the lower surface of the stopper to sink to a position lower than the upper surface of the filter element, so that the stopper and the photosensitive assembly can at least partially overlap in a direction of an optical axis, ensuring that the position of the stopper is closer to the bottom surface of the photosensitive assembly, which helps to reduce the overall height of the camera module to meet the requirements of making the camera module thin and lightweight.

In one embodiment of the present application, the lens assembly further comprises a fixed part mounted on the support substrate, the fixed part and the support substrate define a cavity, and the movable part is movably constrained within the cavity.

In one embodiment of the present application, the stopper is provided on the fixed part.

In one embodiment of the present application, the movable part is constrained to the fixed part in a manner that it can move along the optical axis direction of the optical lens, and the stopper is at least partially located below the movable part.

In one embodiment of the present application, along a direction parallel to the optical axis of the optical lens, a distance between the movable part and the stopper is smaller than a distance between the movable part and the filter element.

With such arrangement, the stopper of the present application can prevent the movable part of the lens assembly from colliding with the filter element when moving downward along the optical axis, thereby avoiding the filter element from being cracked.

In one embodiment of the present application, an upper surface of the stopper is higher than an upper surface of the filter element.

With such an arrangement, the camera module of the present application can reserve more space above the filter element to arrange the optical lens, thereby making it easier to achieve that the axial distance between the movable part and the stopper is smaller than the axial distance between the movable part and the filter element, thereby reducing the design difficulty and making it less likely for the optical lens to collide with the filter element.

In one embodiment of the present application, along a direction parallel to the optical axis of the optical lens, a distance between the stopper and the support substrate is smaller than a distance between an upper surface of the stopper and an upper surface of the filter element.

With such a configuration, the camera module of the present application can design the height position of the stopper to be lower, so as to further reduce the overall height of the camera module.

In one embodiment of the present application, the photosensitive assembly further comprises a bracket which is at least partially located above the support substrate, and a recessed portion is provided on a top of the bracket. The filter element is installed in the recessed portion, and the upper surface of the stopper is higher than an upper surface of the bracket.

With such an arrangement, the camera module of the present application can accommodate at least a portion of the filter element in the recessed portion, can further lower the height position of the filter element, and increase the distance between the filter element and the movable part, thereby making it less likely for the movable part to collide with the filter element.

In one embodiment of the present application, the support substrate comprises a photosensitive circuit board electrically connected to the photosensitive chip, wherein the bracket is fixedly connected to the photosensitive circuit board, and a gap is formed between the bracket and the fixed part, the electronic components on the photosensitive circuit board are located between an outer wall of the bracket and an inner wall of the fixed part.

With such an arrangement, the camera module of the present application can reduce the circumferential size of the bracket, thereby reducing the size of the filter element and improving the crack resistance of the filter element.

In one embodiment of the present application, the lens assembly further comprises a shielding part extended inward from an inner wall of the fixed part, and along a direction parallel to the optical axis of the optical lens, the shielding part is located between the movable part and the electronic components.

With such a configuration, the shielding part of the present application can shield the electronic components, which can not only protect the electronic components, but also block light from irradiating to the electronic components, effectively reducing the impact of stray light.

In one embodiment of the present application, the photosensitive assembly further comprises a step part which is arranged on the outer wall of the bracket, and the shielding part is extended inward from the inner wall of the fixed part to be above a step surface of the step part.

With such arrangement, a space for avoiding the shielding part can be formed above the step surface of the step part of the present application, so as to further reduce the module size.

In one embodiment of the present application, the support substrate comprises a photosensitive circuit board electrically connected to the photosensitive chip, wherein the bracket is injection molded on the support substrate and encapsulates an electrical connection structure between the photosensitive chip and the photosensitive circuit board.

In one embodiment of the present application, the lens assembly further comprises a rigid member which comprises a first portion embedded in the fixed part and a second portion extended inward from the first portion into the cavity, the stop member is a flexible material member installed on the second portion.

With such a configuration, the movable part of the present application will first contact the stopper made of a flexible material before contacting the filter element, ensuring that the stopper has a good buffering effect and can prevent the movable part from generating chips when colliding with the stopper made of a hard material.

In one embodiment of the present application, the stopper is provided on the movable part.

In one embodiment of the present application, the movable part is constrained to the fixed part in such a manner that it can move along the optical axis direction of the optical lens, and along the direction parallel to the optical axis of the optical lens, the distance between the stopper and the photosensitive assembly is smaller than the distance between the optical lens and the filter element.

the stopper of the present application can prevent the movable part of the lens assembly from directly contacting the filter element of the photosensitive assembly when moving downward along the optical axis, thereby avoiding damage to the filter element.

In one embodiment of the present application, the filter element is mounted on the support substrate.

According to another aspect of the present application, the present application further provides an electronic device comprising a device body and any of the camera modules described above, wherein the camera module is assembled on the device body.

Figure 1:
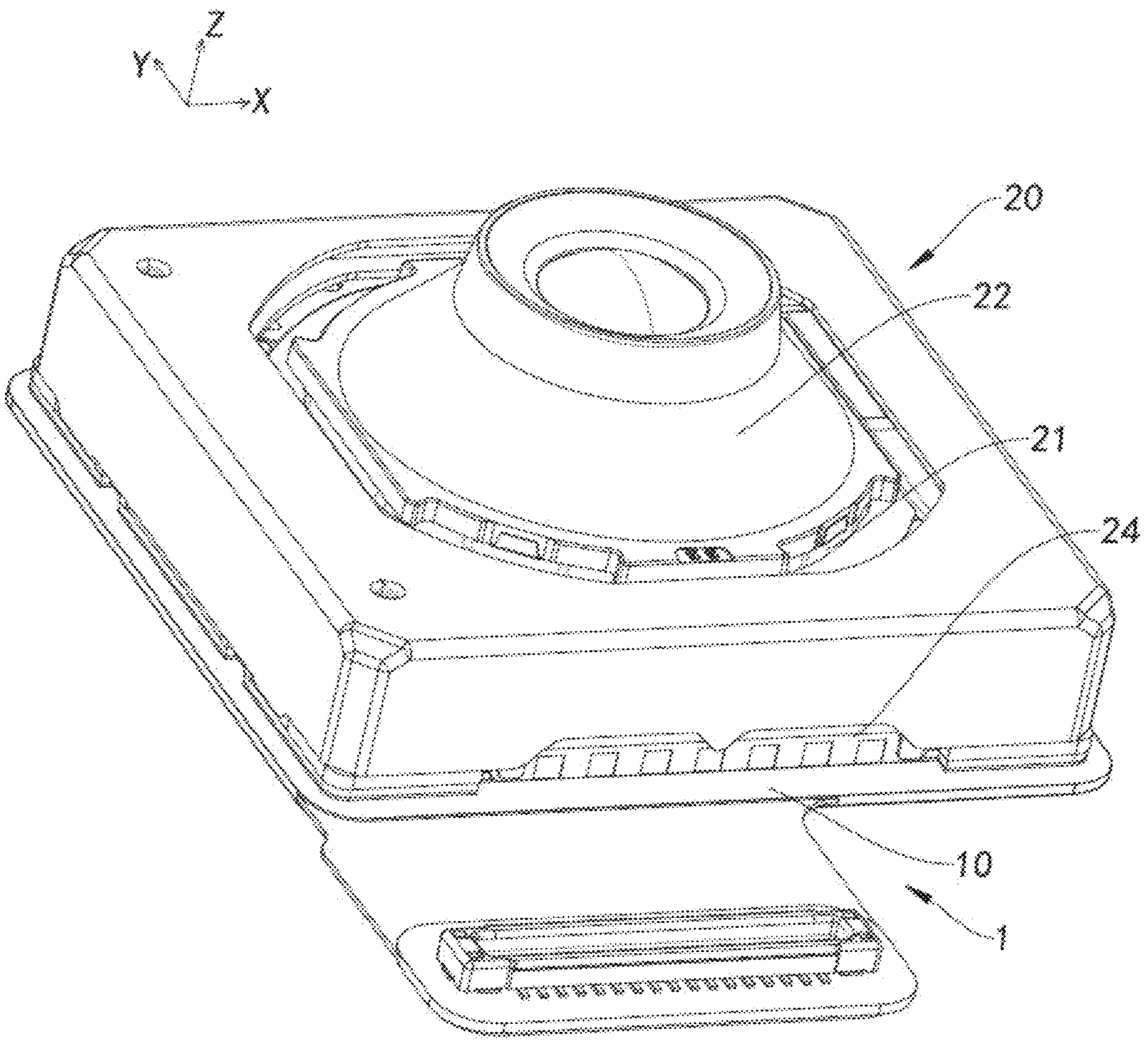
FIG. 1 is a perspective view of a camera module according to an embodiment of the present application.
Figure 2:
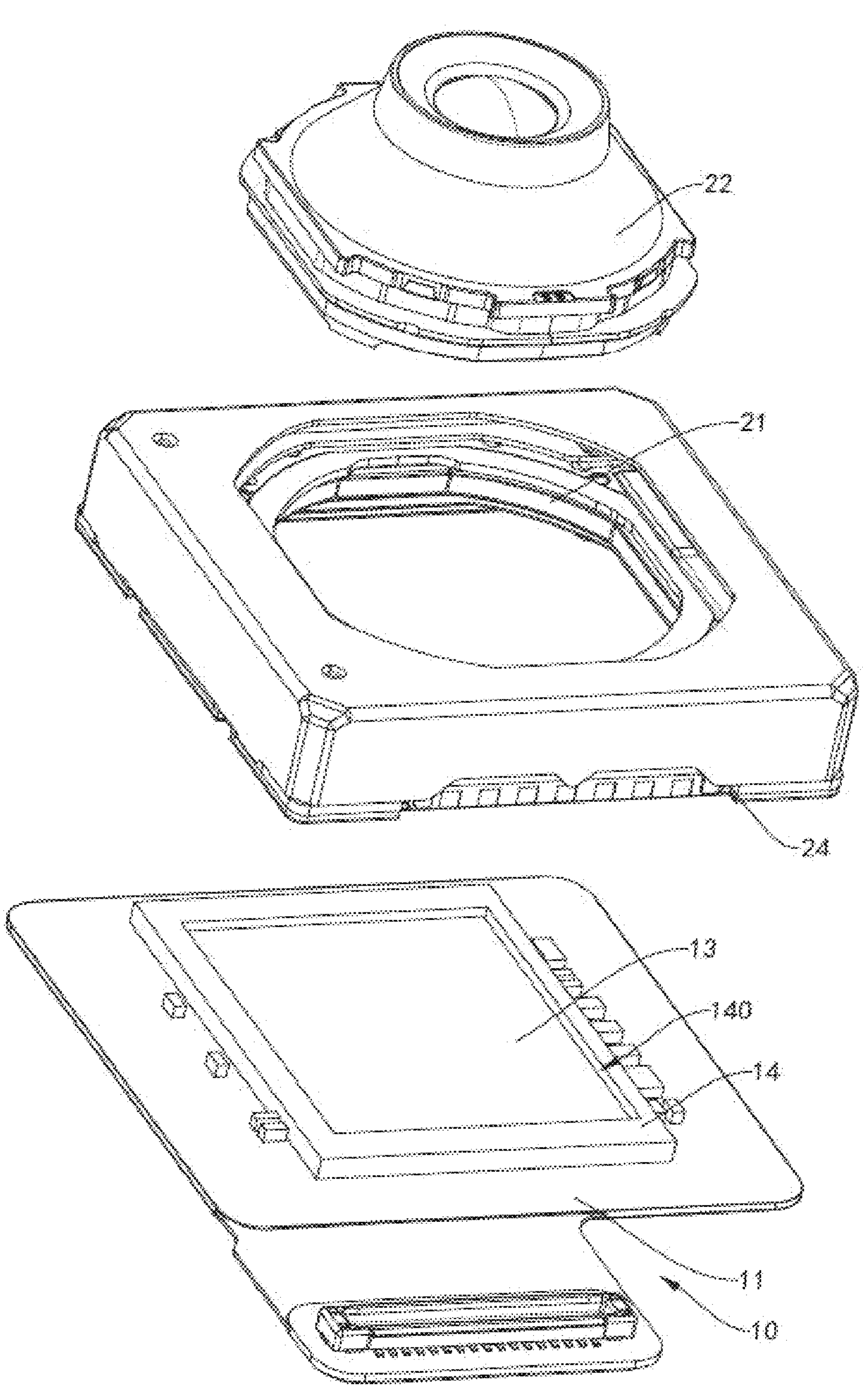
FIG. 2 is an exploded view of the camera module according to a first example of the above embodiment of the present application.

Reference numerals in the drawings: 1, Camera module; 10, Photosensitive assembly; 11, Support substrate; 111, Photosensitive circuit board; 1110, Electronic components;

112, Reinforcing plate; 1121, First support portion; 1122, Second support portion; 12, Photosensitive chip; 13, Filter element; 14, Bracket; 140, Concave part; 15, Step part; 20, Lens assembly; 200, Cavity; 21, Movable part; 211, Focus bracket; 212, Magnetic member; 213, Anti-shake bracket; 214, Ball bearing; 215, Guide rod; 22, Optical lens; 23, Stopper; 24, Fixed part; 241, Lens base; 242, Lens circuit board; 243, Coil; 25, Shielding part; 26, Rigid member; 261, First portion; 2611, Rear embedded arm; 2612, Left embedded arm; 2613, Right embedded arm; 2614, Partial embedded arm; 262, Second portion; 2621, First support arm; 2622, Second support arm; 27, gap.

The above description of the main component symbols is combined with the accompanying drawings and specific implementation methods to further illustrate the present invention in detail.

DETAILED DESCRIPTION OF THE PREFERRED EMBODIMENT

The following will be combined with the drawings in the embodiments of the present invention to clearly and completely describe the technical solutions in the embodiments of the present invention. Obviously, the described embodiments are only part of the embodiments of the present invention, not all of the embodiments. Based on the embodiments of the present invention, all other embodiments obtained by ordinary technicians in this field without creative work are within the scope of protection of the present invention.

It should be noted that when a component is referred to as being "mounted on" another component, it may be directly on the other component or there may be a central component. When a component is considered to be "set on" another component, it may be directly set on the other component or there may be a central component at the same time. When a component is considered to be "fixed to" another component, it may be directly fixed on the other component or there may be a central component at the same time.

Unless otherwise defined, all technical and scientific terms used herein have the same meaning as those commonly understood by those skilled in the art to which the present invention belongs. The terms used herein in the specification of the present invention are only for the purpose of describing specific embodiments and are not intended to limit the present invention. The term "or/and" used herein includes any and all combinations of one or more of the related listed items.

Considering that the lens assembly in the conventional camera module is usually located above the photosensitive assembly as a whole, the height of the camera module is still relatively large, which makes it difficult to meet the requirements of thinness and lightness of the camera module. Therefore, the present application proposes a camera module and an electronic device which can effectively reduce the module height and meet the requirements of thinness and lightness of the camera module.

Specifically, referring to FIG. 1, an embodiment of the present application provides an electronic device, which may include a device body and a camera module 1 mounted on the device body, so as to collect image information for the device body through the camera module 1. It is understood that the electronic device mentioned in the present application may be implemented as, but not limited to, a smart phone, a smart watch, a tablet or a notebook, etc.

More specifically, as shown in FIGS. 1 to 13, the camera module 1 may comprise a photosensitive assembly 10 and a lens assembly 20. The photosensitive assembly 10 comprises a support substrate 11, a photosensitive chip 12 disposed on the support substrate 11, and a filter element 13 disposed in the photosensitive path of the photosensitive chip 12, wherein the filter element 13 is at least partially located above the support substrate 11, so that in the vertical direction (i.e., the optical axis direction of an optical lens 22), the filter element 13 is closer to the optical lens 22, and the support substrate 11 is farther away from the optical lens 22. The lens assembly 20, which is assembled on the support substrate 11, comprises a movable part 21, the optical lens 22, and a stopper 23 for limiting the movement of the movable part 21. The optical lens 22 is disposed on the movable part 21, and the optical lens 22 is located in the photosensitive path of the photosensitive chip 12. The stopper 23 is located at an outer side of the filter element 13, and a lower surface of the stopper 23 is lower than an upper surface of the filter element 13.

In this way, the camera module 1 of the present application configure the stopper 23 outward to the outer side of the filter element 13, allowing the lower surface of the stopper 23 to sink to a position lower than the upper surface of the filter element 13, so that the stopper 23 and the photosensitive assembly 10 can at least partially overlap in an optical axis direction of the optical lens 22, ensuring that the position of the stopper 23 is closer to the bottom surface of the photosensitive assembly 10, which helps to reduce the overall height of the camera module 1, so as to meet the requirements of the camera module 1 to be lightweight.

It is worth noting that the stopper 23 can be, but is not limited to, implemented as a flexible material member so as to reduce chipping and deformation when limiting the movement of the movable part 21.

For example, as shown in FIG. 2 to FIG. 7, in a first example of the present application, the lens assembly 20 may further comprise a fixed part 24 mounted on the support substrate 11, the fixed part 24 and the support substrate 11 together define a cavity 200, and the movable part 21 is movably constrained within the cavity 200. It is understandable that the present application does not limit the installation method of the fixed part 24 on the support substrate 11, for example: the fixed part 24 may be formed separately first, and then the fixed part 24 may be bonded to the support substrate 11 through a conductive or non-conductive adhesive, or the fixed part 24 may be formed on the support substrate 11 through a molding process or a compression molding process. In addition, in other examples of the present application, the lens assembly 20 may not comprise the fixed part 24, and the fixed part is constituted by a part of the support substrate 11, and the movable part of the lens assembly 20 is mounted on the fixed part of the support substrate 11, which can reduce the assembly process, and more importantly, can further reduce the size of the camera module 1.

It is worth noting that the movable part 21 mentioned in the present application can drive the optical lens 22 to move with respect to the photosensitive chip 12, and the present application does not limit the movement of the optical lens 22 with respect to the photosensitive chip 12. For example, the optical lens 22 can move along the optical axis of the optical lens 22 with respect to the photosensitive chip 12 to achieve the autofocus function of the camera module, and/or, the optical lens 22 can move or rotate with respect to the photosensitive chip 12 in a direction perpendicular to the optical axis of the optical lens 22 to achieve the optical image stabilization function of the camera module 1.

In addition, since the fixed part 24 and the support substrate 11 are relatively stationary, the movement of the movable part 21 is limited by the stopper 23 to prevent the movable part 21 from directly colliding with the fixed part 24 and the photosensitive assembly 10. It can be understood that the movement limit of the movable part 21 by the stopper 23 is coordinated with the movement direction of the movable part 21, that is, when the movable part 21 is designed to move along the optical axis of the optical lens 22 (such as the Z direction in FIG. 1), the stopper 23 limits the movement of the movable part 21 along the optical axis to approach or move away from the photosensitive assembly 10; when the movable part 21 is designed to move along the direction perpendicular to the optical axis of the optical lens 22 (such as the X direction or the Y direction in FIG. 1), the stopper 23 limits the movement of the movable part 21 along the direction perpendicular to the optical axis of the optical lens 22.

Optionally, as shown in FIGS. 3 to 7, the stopper 23 is disposed on the fixed part 24 so as to block the movable part 21 and prevent the movable part 21 from colliding with the photosensitive assembly 10.

Figure 3:
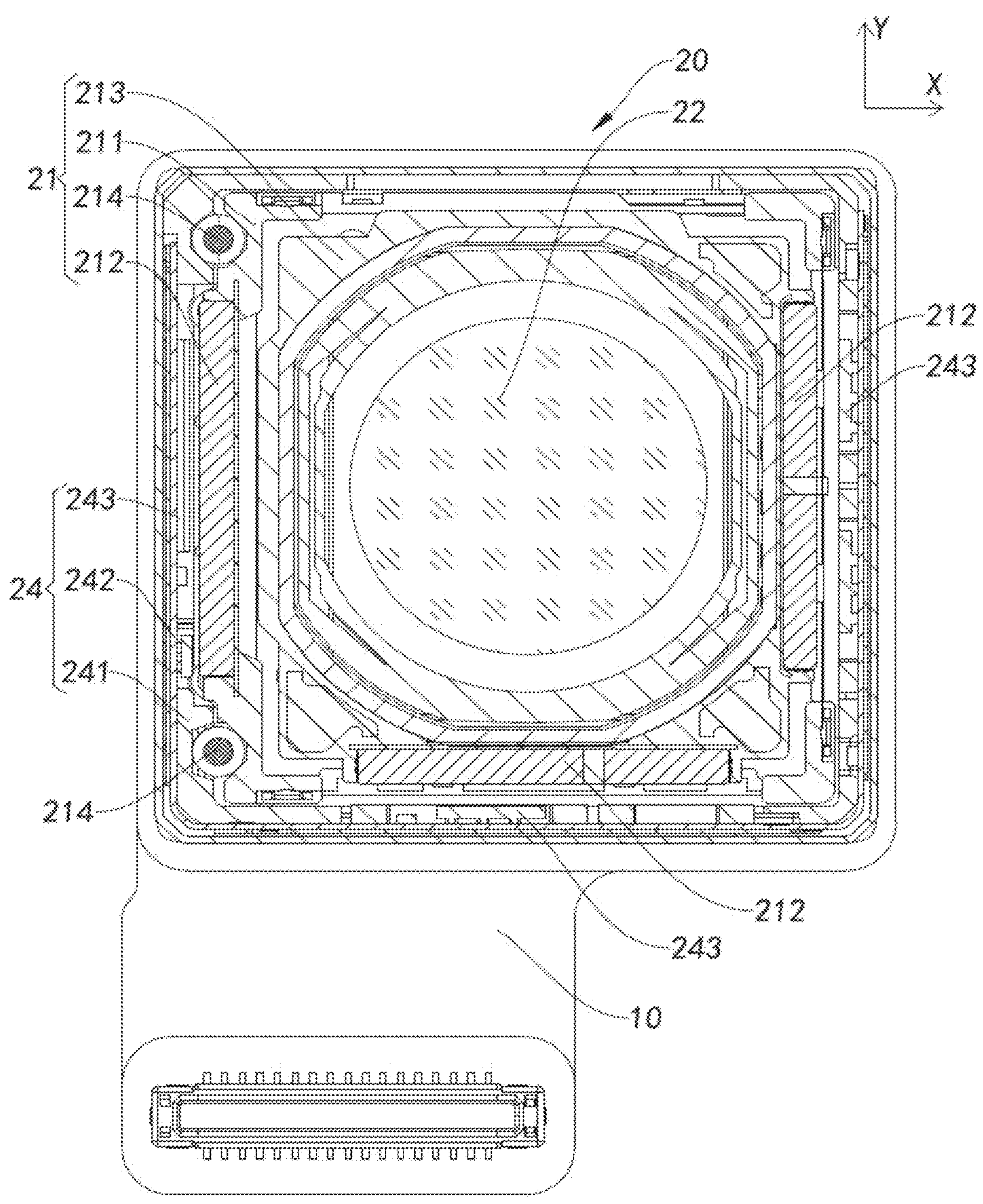
FIG. 3 is a transverse cross-sectional view of the camera module according to the first example of the present application.
Figure 4:
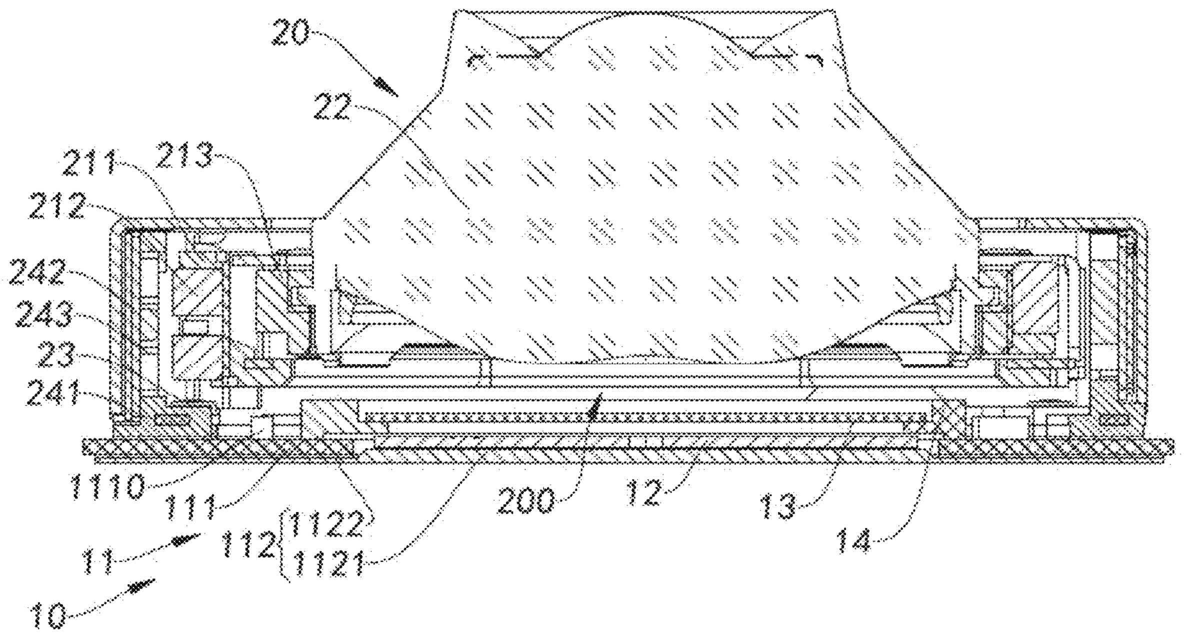
FIG. 4 is a longitudinal cross-sectional view of the camera module according to the first example of the present application.
Figure 5:
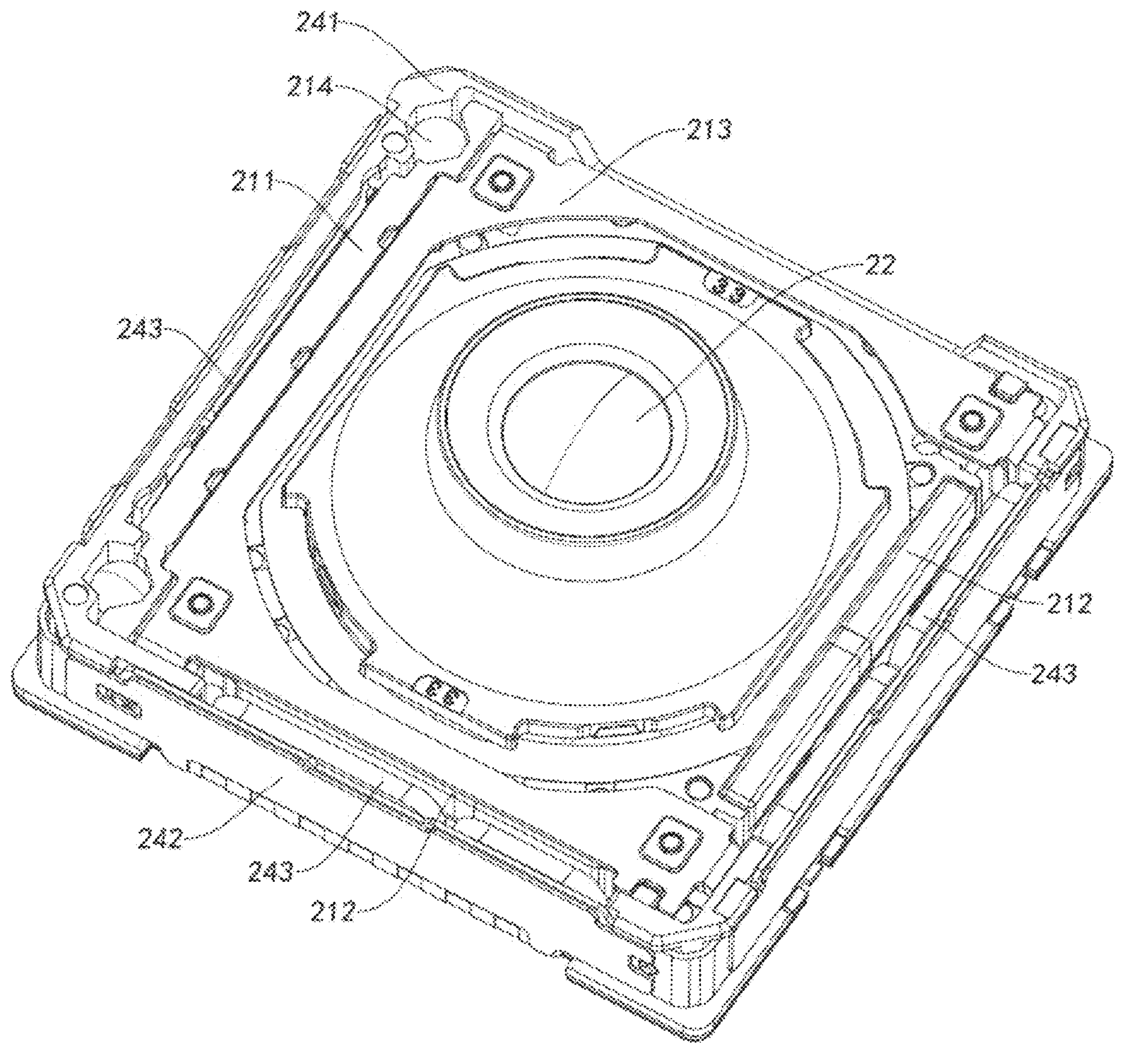
FIG. 5 is a schematic view showing the camera module according to the first example of the present application, wherein the housing and the photosensitive assembly are omitted.
Figure 6:
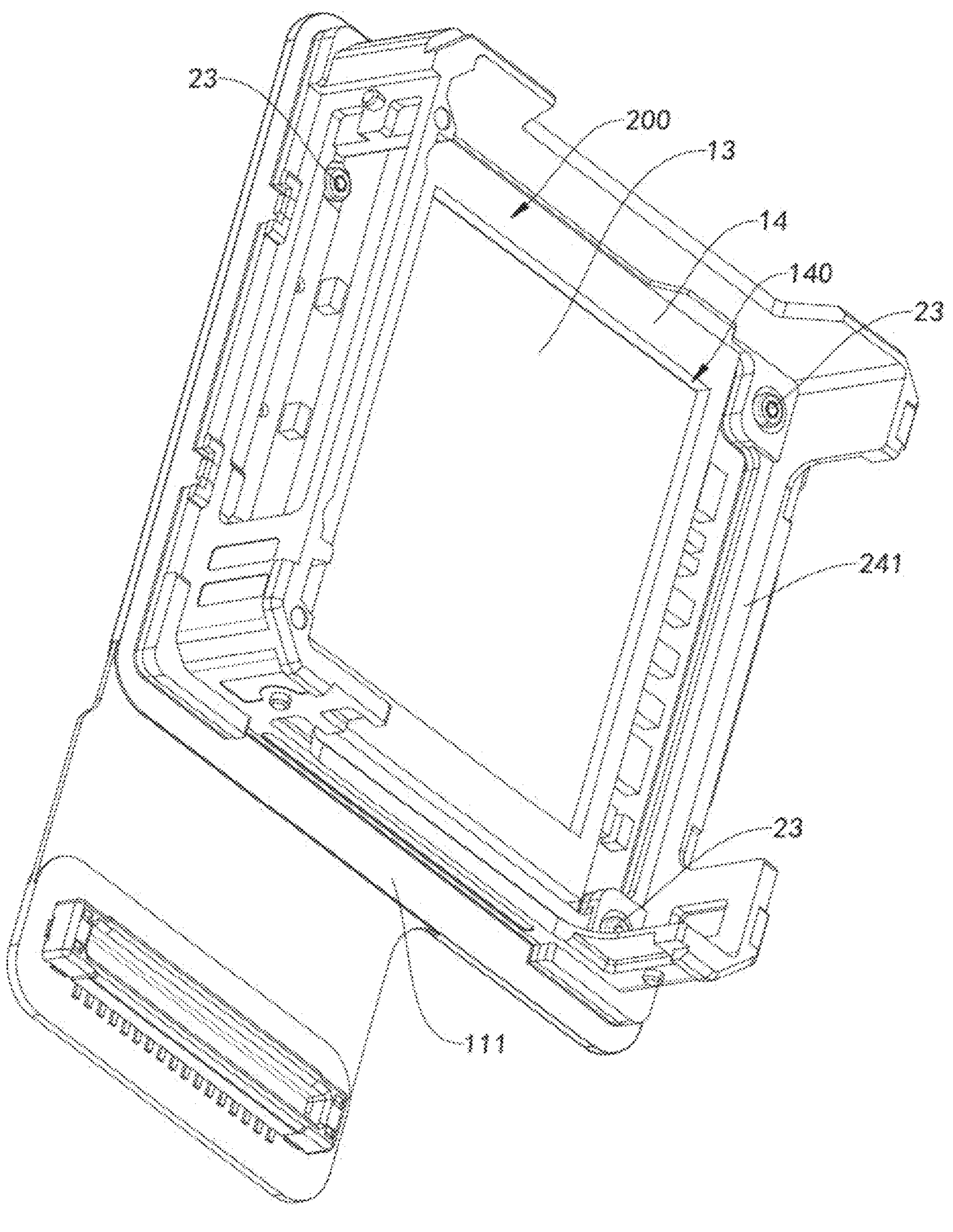
FIG. 6 is a perspective view of the camera module according to the first example of the present application, wherein the movable part and the optical lens are omitted.

Further, as shown in FIGS. 3 to 5, the movable part 21 is constrained to the fixed part 24 in a manner that it can move along the optical axis direction of the optical lens 22, and the stopper 23 is at least partially located below the movable part 21. In this way, when the movable part 21 moves downward along the optical axis direction of the optical lens 22 to achieve the autofocus function, the stopper 23 can prevent the movable part 21 from moving downward excessively, thereby preventing the movable part 21 from colliding with the photosensitive assembly 10. It can be understood that the stopper 23 mentioned in the present application can be located below the movable part 21 as a whole, or can be located partially below the movable part 21. As long as the stopper 23 is located below the corresponding position on the movable part 21, the desired stopping effect can be achieved. In addition, in other examples, the stopper 23 can be at least partially located below the movable part 21 to limit the upward movement of the movable part 21 along the optical axis.

It is worth noting that, as shown in FIGS. 3 and 4, the movable part 21 mentioned in the present application may comprise but is not limited to a focus bracket 211 connected to the optical lens 22 and a magnetic member 212 fixed to the focus bracket 211; at the same time, the fixed part 24 mentioned in the present application may comprise but is not limited to a lens base 241 installed on the support substrate 11, a lens circuit board 242 arranged on a side wall of the lens base 241, and a coil 243 arranged on the lens circuit board 242 at a position corresponding to the magnetic member 212; the focus bracket 211 is movably arranged on the lens base 241, so that when the coil 243 is energized, a Lorentz force is generated between the coil 243 and the magnetic member 212, driving the focus bracket 211 to move along the optical axis, and driving the optical lens 22 to move along the optical axis (i.e., the Z-axis direction), thereby realizing the automatic focusing function of the camera module 1. It can be understood that in other examples of the present application, the magnetic member 212 can be set in the fixed part 24, and the coil 243 can be set in the movable part 21; in other embodiments of the present application, the movable part 21 can also adopt other types of driving mechanisms such as piezoelectric actuators, SMA actuators, etc.

In addition, in order to realize the optical image stabilization function of the camera module 1, as shown in FIGS. 3 to 5, the movable part 21 of the present application may further comprise an anti-shake bracket 213 that is movably arranged in the focus bracket 211 and fixedly connected to the optical lens 22; at this time, a pair of magnetic members 212 are fixedly arranged on the adjacent side walls of the anti-shake bracket 213, and a pair of coils 243 corresponding to the two magnetic members 212 are additionally arranged on the lens circuit board 242 as anti-shake image stabilization coils. In this way, when a certain image stabilization coil is energized, a Lorentz force will be generated between the image stabilization coil and the corresponding magnetic member 212 to drive the anti-shake bracket 213 to move left and right or forward and backward, and drive the optical lens 22 to move along the left and right direction (i.e., the X-axis direction as shown in FIG. 3) or the forward and backward direction (i.e., the Y-axis direction as shown in FIG. 3), so as to realize the X-axis or Y-axis image stabilization function of the camera module 1. It can be understood that the magnetic members 212 mentioned in the present application can be implemented as magnets or magnets, but are not limited to them. It is understandable that in other embodiments, the lens assembly 20 may not comprise an anti-shake mechanism, that is, the lens assembly 20 only comprises an autofocus drive mechanism, so that the camera module 1 is only an autofocus module, or the anti-shake mechanism is arranged in the photosensitive assembly 10 such as the chip is arranged to have an anti-shake function, so that the camera module 1 is implemented as a lens focus and anti-shake module.

Optionally, as shown in FIG. 3 and FIG. 5, the movable part 21 of the lens assembly 20 further comprises a ball bearing 214 disposed between the lens base 241 and the focus bracket 211, so as to support the focus bracket 211 axially movably within the lens base 241, so as to meet the moving space required for autofocus. In addition, a ball bearing may also be disposed between the focus bracket 211 and the anti-shake bracket 213, so as to movably support the anti-shake bracket 213 on the focus bracket 211, so as to meet the moving space required for optical image stabilization.

Optionally, as shown in FIG. 4, along the direction parallel to the optical axis of the optical lens 22, a distance between the movable part 21 and the stopper 23 is smaller than a distance between the movable part 21 and the filter element 13, so that the movable part 21 is closer to the stopper 23; when the movable part 21 of the lens assembly 20 drives the optical lens 22 to move downward along the optical axis direction of the optical lens 22, the movable part 21 first contacts the stopper 23, which can ensure that the optical lens 22 does not collide with the filter element 13, thereby preventing the filter element 13 from being cracked.

Figure 7:
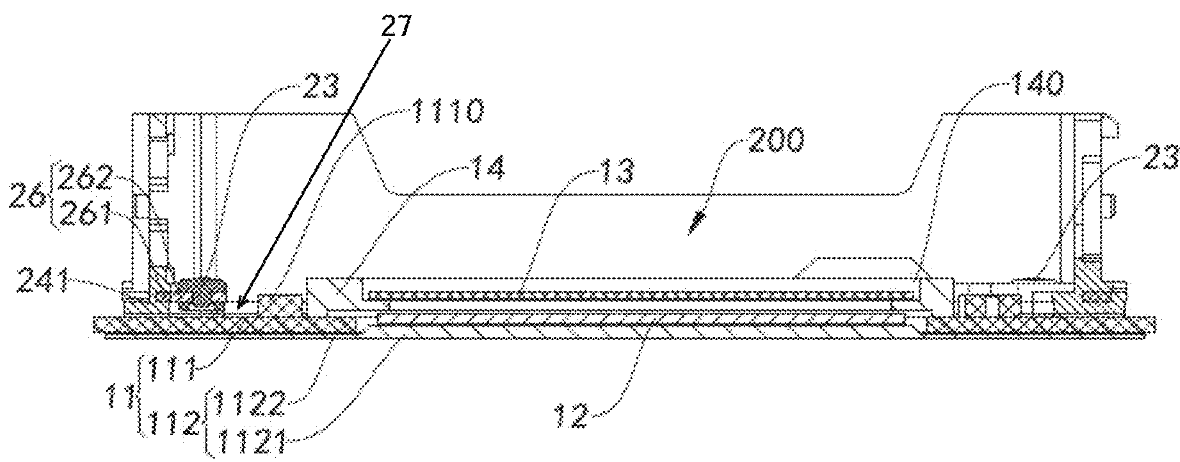
FIG. 7 is a longitudinal cross-sectional view of the camera module shown in FIG. 6.

Preferably, as shown in FIG. 7, the upper surface of the stopper 23 is higher than the upper surface of the filter element 13. In this way, the camera module 1 of the present application can reserve more space above the filter element 13 to arrange the optical lens 22, so that it is easier to achieve that the axial distance between the movable part 21 and the stopper 23 is smaller than the axial distance between the movable part 21 and the filter element 13, reducing the design difficulty, and making it less likely for the optical lens 22 to collide with the filter element 13.

In addition, as shown in FIG. 7, along the direction parallel to the optical axis of the optical lens 22, a distance between the stopper 23 and the support substrate 11 can be smaller than a distance between the upper surface of the stopper 23 and the upper surface of the filter element 13. In this way, the camera module 1 of the present application can design the height position of the stopper 23 to be lower, so as to further reduce the overall height of the camera module 1; and, because there are inevitable tolerances in the production and assembly of the stopper 23 and the filter element 13, the distance between the upper surface of the stopper 23 and the upper surface of the filter element 13 is designed to be larger, which can also reduce the upper surface of the filter element 13 being higher than the upper surface of the stopper 23 or flush with the upper surface of the stopper 23 due to processing tolerance and assembly tolerance.

According to the above mentioned first example of the present application, as shown in FIGS. 2 to 7, the photosensitive assembly 10 may further comprise a bracket 14 which is at least partially located above the support substrate 11, a concave part 140 is provided on a top of the bracket 14, the filter element 13 is mounted in the concave part 140, and the upper surface of the stopper 23 is higher than the upper surface of the bracket 14, so as to effectively prevent the movable part 21 from colliding with the bracket 14. In addition, the filter element 13 of the present application is mounted in the concave part 140 of the bracket 14, that is, the filter element 13 is arranged downward with respect to the bracket 14, and at least a part of the filter element 13 can be accommodated in the concave part 140, which can further reduce the height position of the filter element 13 and increase the distance between the filter element 13 and the movable part 21, so that the movable part 21 is less likely to collide with the filter element 13. M ore preferably, the lower surface of the filter element 13 is designed to be lower than the upper surface of the bracket 14, which can further thin the photosensitive assembly 10 and enhance the anti-collision effect of the filter element 13.

Optionally, as shown in FIGS. 4 and 7, the support substrate 11 comprises a photosensitive circuit board 111 electrically connected to the photosensitive chip 12, wherein the bracket 14 is fixedly connected to the photosensitive circuit board 111, and a gap 27 is formed between the bracket 14 and the fixed part 24; the electronic components 1110 on the photosensitive circuit board 111 are located between an outer wall of the bracket 14 and an inner wall of the fixed part 24, so as to reduce the circumferential size of the bracket 14, and then reduce the size of the filter element 13, which is beneficial to improve the crack resistance of the filter element 13.

It is worth noting that a front side of the photosensitive chip 12 may have a photosensitive area and a non-photosensitive area located outside the photosensitive area, and the non-photosensitive area of the photosensitive chip 12 is electrically connected to the photosensitive circuit board 111. The manner in which the non-photosensitive area of the photosensitive chip 12 is electrically connected to the photosensitive circuit board 111 can be selected from any one of the following: the photosensitive chip 12 is located above the photosensitive circuit board 111, and the non-photosensitive area of the photosensitive chip 12 is electrically connected to the front side of the photosensitive circuit board 111 (such as by gold wires), which is similar to the traditional COB packaging structure; or, as shown in FIG. 4, the photosensitive circuit board 111 is provided with a through hole, the photosensitive chip 12 is accommodated in the through hole of the photosensitive circuit board 111, and the non-photosensitive area of the photosensitive chip 12 is electrically connected to the front side of the photosensitive circuit board 111 (such as by gold wires), which is similar to a chip-sinking packaging structure; the photosensitive chip 12 is located below the photosensitive circuit board 111, and the non-photosensitive area of the photosensitive chip 12 is electrically connected to the back side of the photosensitive circuit board 111 (such as by welding or conductive adhesive bonding), which is similar to a chip flip-chip structure.

In addition, the installation base of the photosensitive chip 12 can be the photosensitive circuit board 111, such as the photosensitive chip 12 is mounted on the front side of the photosensitive circuit board 111, or the photosensitive chip 12 is flipped on the back side of the photosensitive circuit board 111; in another embodiment, the installation base of the photosensitive chip 12 can be the bracket 14, such as the bracket 14 is arranged on the front side of the photosensitive circuit board 111, and the photosensitive chip 12 is mounted on the front side of the bracket 14, or the bracket 14 is arranged in the through hole of the photosensitive circuit board 111, and the photosensitive chip 12 is mounted on the front side of the bracket 14, or the photosensitive chip 12 is accommodated in the through hole of the photosensitive circuit board 111, the bracket 14 is arranged on the back side of the photosensitive circuit board 111, and the photosensitive chip 12 is mounted on the front side of the bracket 14.

Optionally, as shown in FIG. 4 and FIG. 7, the support substrate 11 further comprises a reinforcing plate 112 which can be disposed on the front or back of the photosensitive circuit board 111, and the photosensitive chip 12 is mounted on the reinforcing plate 112. It is understood that in other examples of the present application, the reinforcing plate 112 can also be disposed on the surface of the bracket 14 (such as assembled by mounting or embedding), and the photosensitive chip 12 is mounted on the reinforcing plate 112.

Further, as shown in FIG. 4 and FIG. 7, the reinforcing plate 112 may comprise a first support portion 1121 for mounting the photosensitive chip 12 and a second support portion 1122 located around the first support portion 1121 and mounted on the photosensitive circuit board 111, so as to strengthen the overall structural strength of the photosensitive assembly 10 through the reinforcing plate 112, so that the photosensitive circuit board 111 is not easy to warp, and the photosensitive chip 12 is prevented from breaking. It is understood that the reinforcing plate 112 mentioned in the present application may be, but is not limited to, implemented as a steel plate.

Furthermore, as shown in FIGS. 4 and 7, the first support portion 1121 is protruded upward from the second support portion 1122, that is, an upper surface of the second support portion 1122 is lower than an upper surface of the first support portion 1121, so as to ensure that the camera module 1 has the characteristics of low shoulder height while supporting the photosensitive chip 12 to partially protrude from the top surface of the photosensitive circuit board 111 to avoid blocking the photosensitive field of view of the photosensitive chip 12.

Figure 8:
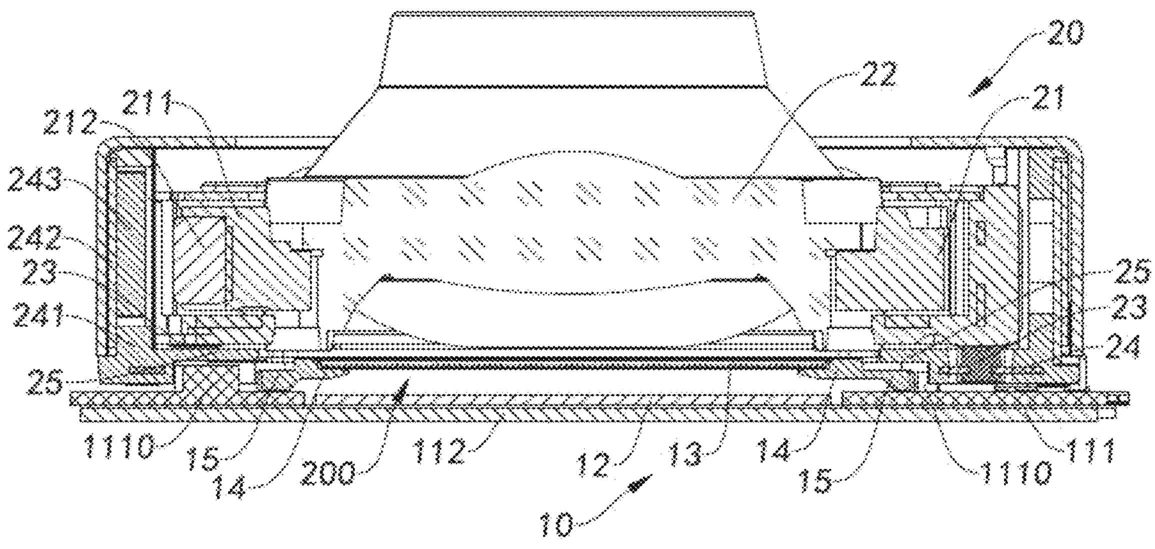
FIG. 8 is a schematic view of a camera module according to a second example of the above embodiment of the present application.

It is worth noting that in the above mentioned first example of the present application, since the electronic components 1110 are usually made of metal, the electronic components 1110 are easy to reflect light and generate a large amount of stray light. In order to solve the stray light problem, FIG. 8 shows a second example of the camera module 1 according to the above mentioned embodiment of the present application. Compared with the above mentioned first example according to the present application, the difference of the camera module 1 according to the second example of the present application is that the lens assembly 20 further comprises a shielding part 25 extending inwardly from the inner wall of the fixed part 24, and the shielding part 25 is located between the movable part 21 and the electronic components 1110 to shield the electronic components 1110, which can not only protect the electronic component 1110, but also block light from irradiating to the electronic components 1110, effectively reducing the influence of stray light.

Further, as shown in FIG. 8, the photosensitive assembly 10 may further comprise a step part 15 which is disposed on the outer side wall of the bracket 14, and the shielding part 25 is extended inward from the inner wall of the fixed part 24 to above a step surface of the step part 15. In this way, a space can be formed above the step surface of the step part 15 to avoid the shielding part 25, so as to further reduce the module size.

Optionally, as shown in FIG. 8, the shielding part 25 is extended inward as a whole from the inner wall of the lens base 241, and a through hole is provided on an outer side of the shielding part 25. The stopper 23 is accommodated in the through hole and protrudes from the upper surface of the shielding part 25, which not only ensures that the stopper 23 is located below the movable part 21, but also can lower the height position of the stopper 23.

Figure 9:
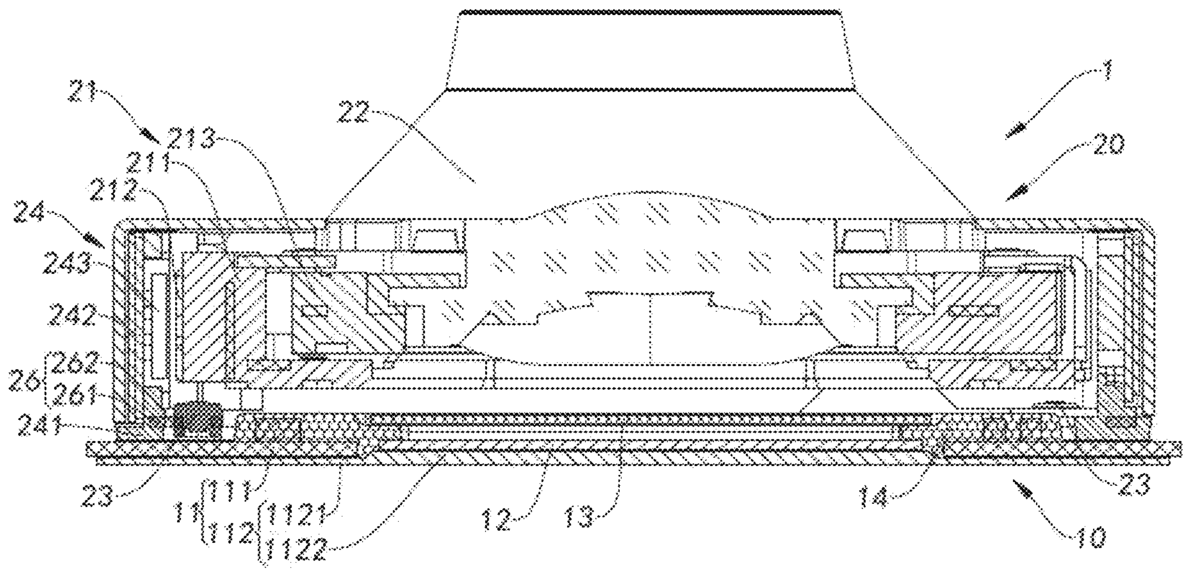
FIG. 9 is a schematic view of a camera module according to a third example of the above embodiment of the present application.

It is worth noting that in the above mentioned first example and the above mentioned second example of the present application, the bracket 14 can be a prefabricated part which is fixed to the photosensitive circuit board 111 of the support substrate 11 by means such as adhesive fixation. In other examples of the present application, the bracket 14 can also be implemented as a molded part. As an example, as shown in FIGS. 9 and 10, in the third example of the present application, the support substrate 11 comprises a photosensitive circuit board 111 electrically connected to the photosensitive chip 12; the bracket 14 is injection molded on the support substrate 11, and encapsulates the electrical connection structure between the photosensitive chip 12 and the photosensitive circuit board 111, so that the bracket 14 can support the filter element 13 while also playing the role of encapsulating the photosensitive chip 12.

In addition, in the above example of the present application, as shown in FIG. 7, the lens assembly 20 may further comprise a rigid member 26, which may comprise a first portion 261 embedded in the fixed part 24 and a second portion 262 extended inwardly from the first portion 261 into the cavity 200; the stopper 23 is implemented as a flexible material member installed on the second portion 262, ensuring that the stopper 23 is located below the movable part 21. In this way, the movable part 21 of the present application will first contact the stopper 23 made of a flexible material before contacting the filter element 13 or the bracket 14, ensuring that the stopper 23 has a good buffering effect, preventing the filter element 13 from being broken by the movable part 21, or preventing the movable part 21 from directly colliding with the bracket 14 and causing chipping or deformation. It is understandable that the rigid member 26 mentioned in the present application can be implemented as, but not limited to, a conductive sheet such as a copper sheet embedded in the lens base 241. In addition to being a reinforcing member of the lens base 241, it can also be used as a conductive member (such as when the lens assembly needs to be powered), which is not described in detail in the present application. In other embodiments, the lens assembly 20 may not comprise the rigid member 26, and the stopper 23 is directly mounted on the fixed part, such as by bonding or embedding.

Figure 10:
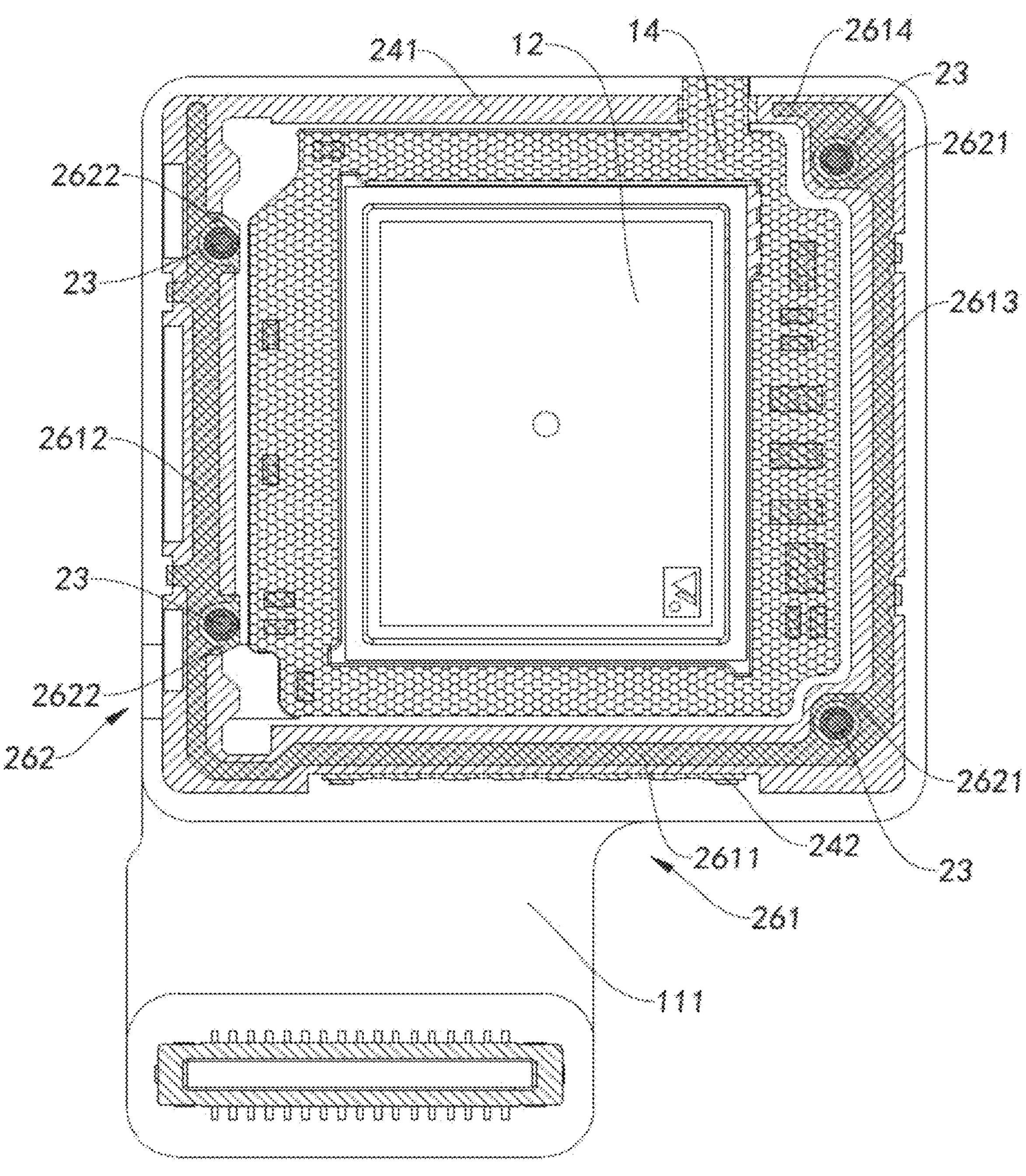
FIG. 10 is a transverse cross-sectional view of a camera module according to the third example of the present application.

Optionally, in a third example of the present application, as shown in FIG. 10, the first portion 261 of the rigid member 26 comprises a rear embedded arm 2611 extended leftwardly along a rear side wall of the lens base 241, a left embedded arm 2612 extended forwardly from a left end of the rear embedded arm 2611 along a left side wall of the lens base 241, and a right embedded arm 2613 extended forwardly from a right end of the rear embedded arm 2611 along a right side wall of the lens base 241; the second portion 262 of the rigid member 26 comprises a pair of first support arms 2621 extended inwardly from front and rear ends of the right embedded arm 2613 to extend into the cavity 200, and a pair of second support arms 2622 extended inward from an inner side of the left embedded arm 2612 to extend into the cavity 200 and arranged at intervals; the first support arms 2621 and the second support arms 2622 are both fixed with the stopper 23, so that the multiple stoppers 23 can be distributed as evenly as possible in the circumferential direction, so that the buffering effect of the stopper 23 on the movable part 21 of the lens assembly 20 can be more uniform, and the movable part 21 can be prevented from being skewed under the buffering effect of the stopper 23.

In addition, since the first support arm 2621 at the front end of the right embedded arm 2613 is adjacent to an edge of the rigid member 26, the first support arm 2621 at the front end of the right embedded arm 2613 is easily deformed during the solidification process of the lens base 241, thereby affecting the position accuracy of the stopper 23 at the front end of the right embedded arm 2613, and it is difficult to ensure that the four stoppers 23 remain flush. In this way, when the focus bracket 211 moves downward along the optical axis to collide with the stopper 23, the focus bracket 211 is easily skewed; therefore, as shown in FIG. 10, the first portion 261 of the rigid member 26 may further comprise a partial embedded arm 2614 extending to the left from a front end of the right embedded arm 2613 along a front side wall of the lens base 241, so as to enhance the strength of the rigid member 26 adjacent to the front end of the right embedded arm 2613, reduce the deformation of the first support arm 2621 of the rigid member 26 located at the front end of the right embedded arm 2613 during the curing process of the lens base 241, ensure that the four stoppers 23 remain flush, and prevent the focus bracket 211 from being skewed due to collision with the stoppers 23.

It is worth noting that, although in the above mentioned various examples of the present application, the filter element 13 is mounted on the bracket 14 so as to support the filter element 13 in the photosensitive path of the photosensitive chip 12 through the bracket 14; however, in other examples of the present application, the filter element 13 can also be directly mounted on the support substrate 11 so as to further reduce the height of the photosensitive assembly 10. As an example, in the fourth example of the present application, as shown in FIG. 11, the filter element 13 is mounted on the support substrate 11 so as to reduce the height of the light sensing component 10 while omitting the bracket 14, thereby reducing the overall height of the camera module 1.

Figure 11:
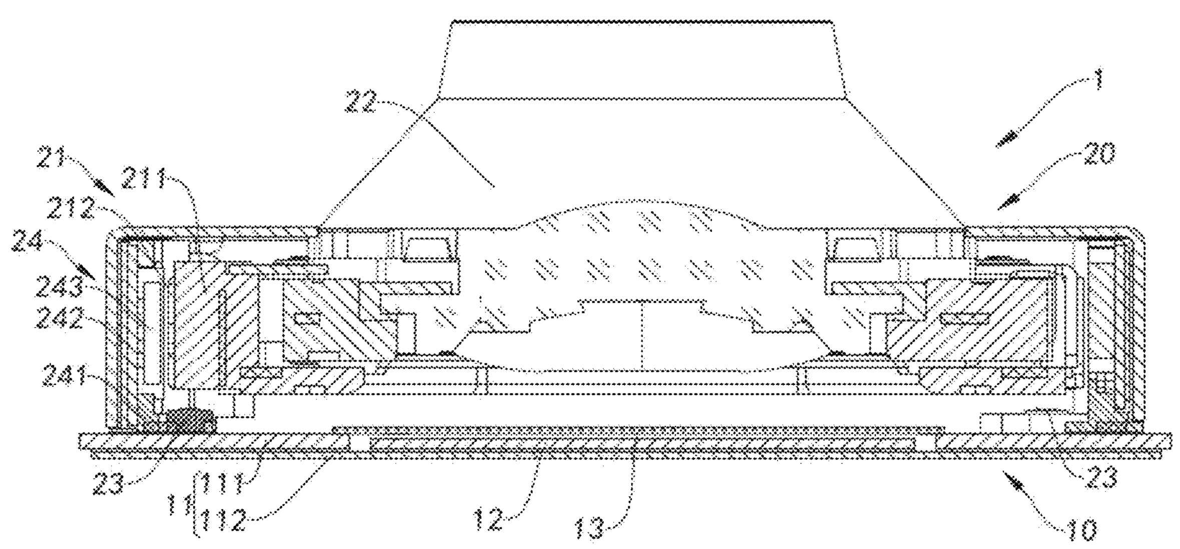
FIG. 11 is a schematic view of a camera module according to a fourth example of the above embodiment of the present application.

Optionally, as shown in FIG. 11, the filter element 13 is mounted on the upper surface of the photosensitive circuit board 111; the reinforcing plate 112 is mounted on the lower surface of the photosensitive circuit board 111; the photosensitive chip 12 is mounted on the reinforcing plate 112 and is located between the reinforcing plate 112 and the filter element 13. In this way, the camera module 1 of the present application can also avoid the filter element 13 and the photosensitive chip 12 being too close to each other, which may easily affect the optical imaging quality.

Figure 12:
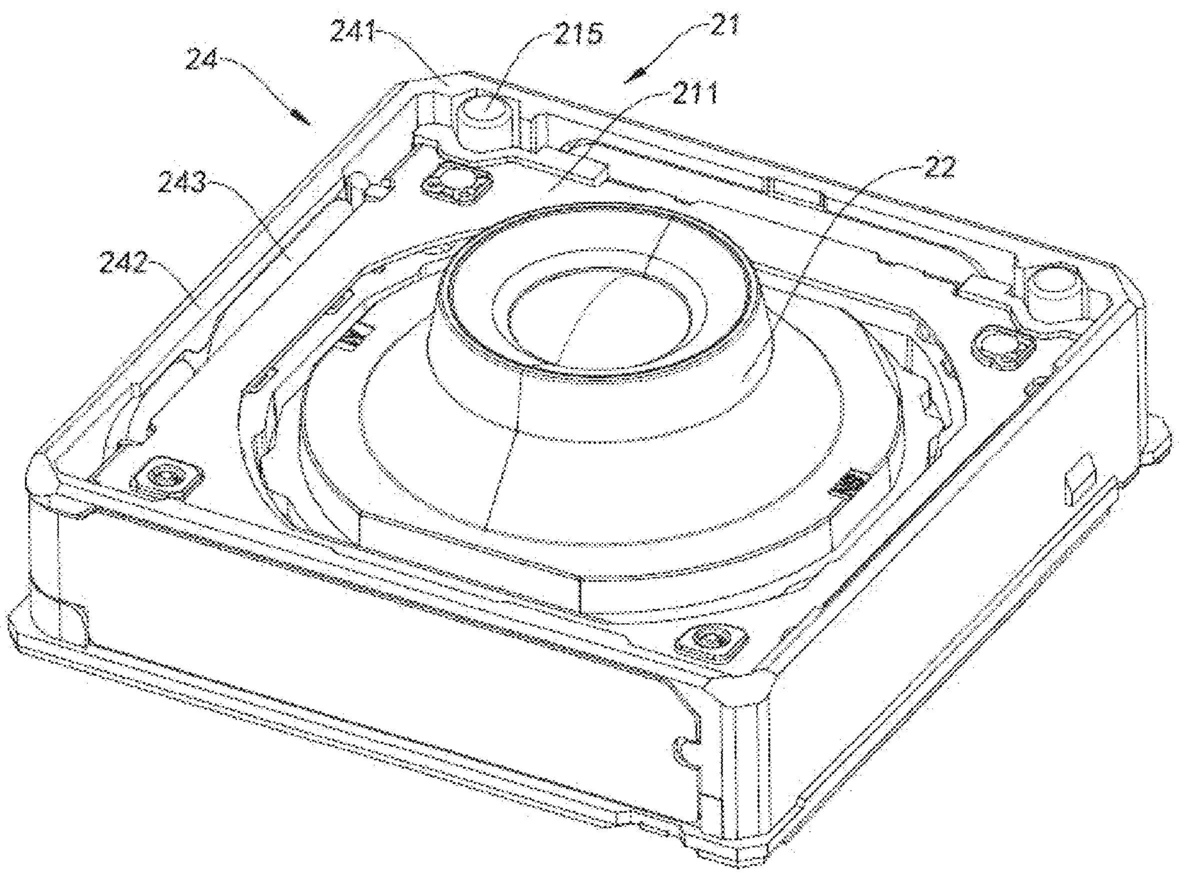
FIG. 12 is a schematic view of a camera module according to a fifth example of the above embodiment of the present application.

It is worth mentioning that in a fifth example of the present application, as shown in FIG. 12, the ball bearing 214 of the movable part 21 in the lens assembly 20 can also be replaced by a guide rod 215 which is extended along the optical axis direction of the optical lens 22, so as to better support the focus bracket 211 axially movably within the lens base 241, so as to facilitate the movement space required for autofocus. It can be understood that the present application does not limit the installation method of the guide rod 215, and the guide rod 215 and the lens base 241 can be processed separately first and then assembled together; or the guide rod 215 can be embedded in the interior of the lens base 241 while the lens base 241 is injection molded.

In addition, although in the above mentioned various examples of the present application, the stopper 23 is arranged on the fixed part 24 of the lens assembly 20, in other examples of the present application, the stopper 23 may also be arranged on the movable part 21 of the lens assembly 20 to prevent the movable part 21 from directly colliding with the photosensitive assembly 10.

Figure 13:
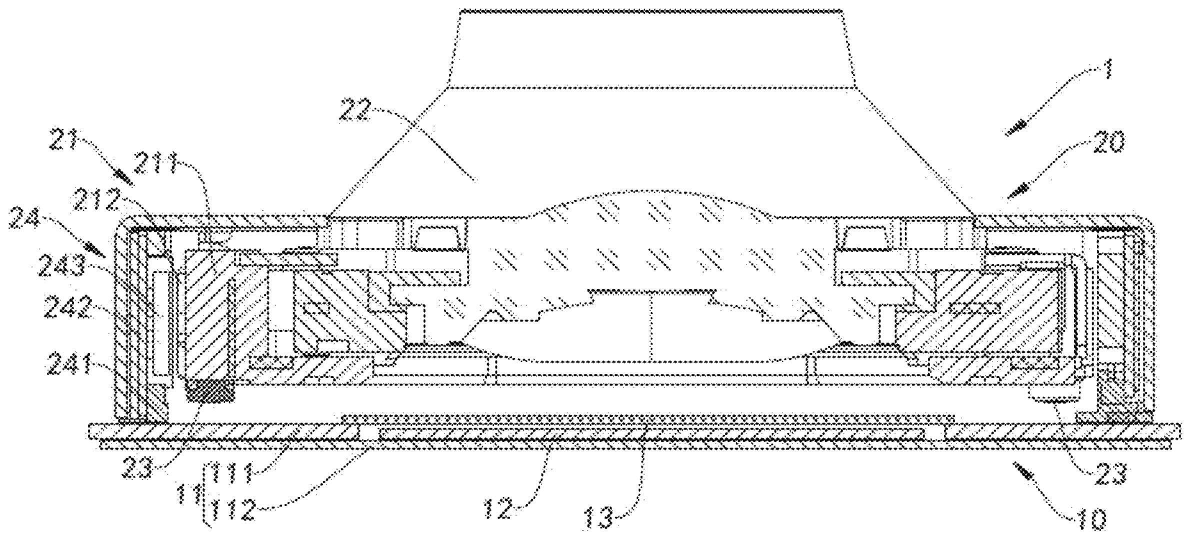
FIG. 13 is a schematic view of a camera module according to a sixth example of the above embodiment of the present application.

For example, as shown in FIG. 13, in the sixth example of the present application, the movable part 21 of the lens assembly 20 is constrained to the fixed part 24 in a manner that it can move along the optical axis direction of the optical lens 22, wherein the stopper 23 is provided on the movable part 21, and the distance between the stopper 23 and the photosensitive assembly 10 is smaller than the distance between the optical lens 22 and the filter element 13. In this way, when the movable part 21 drives the optical lens 22 to move downward, the stopper 23 is first brought into contact with the support substrate 11, so that the stopper 23 of the present application can prevent the optical lens 22 from directly contacting the filter element 13 of the photosensitive assembly 10 when the movable part 21 of the lens assembly 20 moves downward along the optical axis direction, thereby preventing the filter element 13 from being damaged.

Optionally, as shown in FIG. 13, the stopper 23 is fixed to the lower surface of the focus bracket 211 of the movable part 21 and is located at the outer side of the filter element 13, so as to prevent the movable part 21 from colliding with the filter element 13 and prevent the stopper 23 from colliding with the filter element 13, so as to protect the filter element 13 from being broken. It is understandable that in other examples, the stopper 23 can also be installed on the outer side of the movable part 21, as long as a part of the stopper 23 is located below the movable part 21.

The technical features of the above embodiments may be combined arbitrarily. To make the description concise, not all possible combinations of the technical features in the above embodiments are described. However, as long as there is no contradiction in the combination of these technical features, they should be considered to be within the scope of this specification.

The above embodiments only express several implementation methods of the present invention, and the descriptions thereof are relatively specific and detailed, but they cannot be understood as limiting the scope of the invention patent. It should be pointed out that, for ordinary technicians in this field, several variations and improvements can be made without departing from the concept of the present invention, and these all belong to the protection scope of the present invention.

What is claimed is:

1. A camera module, comprising:

a photosensitive assembly comprising a support substrate, a photosensitive chip disposed on the support substrate, and a filter element disposed in a photosensitive path of the photosensitive chip, wherein the filter element is at least partially located above the support substrate; and a lens assembly assembled on the support substrate, wherein the lens assembly comprises a movable part, an optical lens, and a stopper for limiting a movement of the movable part, wherein the optical lens is arranged on the movable part to allow the movable part to drive the optical lens to move, and the optical lens is located in the photosensitive path of the photosensitive chip, wherein the stopper is made of a flexible material and located on an outer side of the filter element, wherein the stopper is located below the optical lens, and a lower surface of the stopper is lower than an upper surface of the filter element, an upper surface of the stopper is higher than the upper surface of the filter element, wherein the stopper is at least partially located below the movable part;

wherein the movable part comprises a focus bracket connected to the optical lens for driving the optical lens to move along the optical axis, wherein the focus bracket is partially located above the filter element, wherein the stopper is located beneath the optical lens with the upper surface of the stopper being located between the filter element and the optical lens;

wherein the lens assembly further comprises a fixed part mounted on the support substrate, the stopper is provided on the fixed part in a manner that the stopper is fixed with respect to the fixed part;

wherein along a direction parallel to an optical axis of the optical lens, a distance between the movable part and the stopper is smaller than a distance between the movable part and the filter element, wherein the stopper is arranged to prevent the movable part of the lens assembly from directly contacting the filter element of the photosensitive assembly when the movable part is moving downward along the optical axis of the optical lens;

wherein the photosensitive assembly further comprises a bracket which is at least partially located above the support substrate, wherein the filter element is installed on the bracket, a gap is formed between the bracket and the fixed part, wherein the support substrate comprises a photosensitive circuit board and electronic components provided on the photosensitive circuit board, wherein the electronic components are located in the gap between the bracket and the fixed part.

2. The camera module according to claim 1, wherein the fixed part and the support substrate define a cavity, and the movable part is movably constrained within the cavity.

3. The camera module according to claim 2, wherein the movable part is constrained to the fixed part in a manner that the movable part is capable of moving along a direction of the optical axis of the optical lens.

4. The camera module according to claim 3, wherein along a direction parallel to the optical axis of the optical lens, a distance between the stopper and the support substrate is smaller than a distance between the upper surface of the stopper and the upper surface of the filter element.

5. The camera module according to claim 3, wherein a recessed portion is provided on a top of the bracket, the filter element is installed in the recessed portion, and the upper surface of the stopper is higher than an upper surface of the bracket.

6. The camera module according to claim 5, wherein the lens assembly further comprises a shielding part extended inward from the inner wall of the fixed part, and along a direction parallel to the optical axis of the optical lens, the shielding part is located between the movable part and the electronic components.

7. The camera module according to claim 6, wherein the photosensitive assembly further comprises a step part which is arranged on the outer wall of the bracket, and the shielding part is extended inward from the inner wall of the fixed part to be above a step surface of the step part.

8. The camera module according to claim 5, wherein the support substrate comprises a photosensitive circuit board electrically connected to the photosensitive chip, wherein the bracket is injection molded on the support substrate and encapsulates an electrical connection structure between the photosensitive chip and the photosensitive circuit board, wherein at least a part of movable part is located above the filter element.

9. The camera module according to claim 2, wherein the lens assembly further comprises a rigid member which comprises a first portion embedded in the fixed part and a second portion extended inward from the first portion into the cavity, the stopper is a flexible material member installed on the second portion.

10. The camera module according to claim 9, wherein the rigid member is a cooper sheet.

* * * * *